United States Patent [19]

Smith

[11] Patent Number: 4,520,042
[45] Date of Patent: May 28, 1985

[54] HIGH-MODULUS, FLEXIBLE URETHANE COATING AND METHOD OF PREPARATION

[75] Inventor: Stuart B. Smith, Conyers, Ga.

[73] Assignee: Thermocell Development, Ltd., Knoxville, Tenn.

[21] Appl. No.: 575,677

[22] Filed: Jan. 31, 1984

Related U.S. Application Data

[63] Continuation-in-part of Ser. No. 505,793, Jun. 20, 1983, Pat. No. 4,452,829.

[51] Int. Cl.³ .............. C08G 18/14; C08G 18/20; B05D 1/00; B05D 1/05
[52] U.S. Cl. .................................. 427/209; 521/902; 521/126; 521/128; 521/129; 428/308.4; 428/422.8; 428/423.1; 428/423.3; 427/244; 427/421; 427/393.5; 427/385.5; 528/54
[58] Field of Search ............... 528/54; 521/128, 127, 521/129; 427/393.5, 385.5

[56] References Cited

U.S. PATENT DOCUMENTS

| | | | |
|---|---|---|---|
| 3,769,244 | 10/1973 | Hashimoto et al. | 521/129 |
| 3,822,223 | 7/1974 | Gemeinhardt et al. | 528/54 |
| 3,862,150 | 1/1975 | Bechara et al. | 528/54 |
| 3,931,387 | 1/1976 | Hostettler | 528/54 |
| 4,134,994 | 1/1979 | Bechara et al. | 521/127 |
| 4,136,241 | 1/1979 | Ammann | 521/127 |
| 4,419,461 | 12/1983 | Arbir et al. | 521/127 |
| 4,456,696 | 6/1984 | Arbir et al. | 521/127 |

OTHER PUBLICATIONS

Union Carbide Tech. Information Bulletin; "One-Step Urethane Foams", Feb. 1959 (5 pages).

Primary Examiner—Herbert S. Cockeram
Attorney, Agent, or Firm—Richard P. Crowley

[57] ABSTRACT

A high-modulus, solid urethane spray coating is prepared by spraying onto a substrate equal volumes of an A-side and a B-side mixture together, the A side comprising 100 parts of a prepolymer prepared by reacting a polyether triol with a low-functionality MDI, and the B side comprising from about 5 to 40 parts of a butane diol and 60 to 95 parts of a polyether triol, and a catalyst system which comprises a tetravalent tin catalyst in combination with an acid-blocked amine catalyst.

19 Claims, No Drawings

HIGH-MODULUS, FLEXIBLE URETHANE COATING AND METHOD OF PREPARATION

REFERENCE TO PRIOR APPLICATION

This application is a continuation-in-part of U.S. patent application Ser. No. 505,793, filed June 20, 1983, now U.S. Pat. No. 4,452,829 hereby incorporated by reference in its entirety.

The sprayable polyisocyanurate composition of the parent application is prepared by mixing and reacting together equal volumes of an A-side and a B-side mixture, with the A-side mixture comprising 60 to 100 parts of MDI of low functionality and 0 to 40 parts of a polyether triol having a hydroxyl number of less than about 50. The B-side mixture comprises from about 5 to 40 parts of diethylene glycol and from about 50 to 90 parts of a polyether triol having a hydroxyl number of about 50 or less. The B-side mixture also comprises a catalytic amount of a trimerization catalyst, to provide for a rapid, exothermic, trimerization reaction of the A and B mixtures on mixing. A catalytic amount of a heat-activated catalyst is employed, to provide for reaction within about 5 seconds. The trimerization catalyst is typically a fatty-acid salt catalyst, while the heat-activated catalyst is an acid-blocked amine salt. A foamable composition also may be provided by including a blowing amount of a blowing agent optionally with a cell-control amount of a surfactant, and generally a tetravalent tin catalyst, to provide a cream time of the foamable mixture of less than 10 seconds.

BACKGROUND OF THE INVENTION

In the past, rubbery, elastomeric-type polymers have been prepared by the reaction of an isocyanate with a diol or triol compound in the presence typically of a tin catalyst and an amine-type (Dabco) catalyst combination. The elastomeric polymer so produced generally contains mostly urethane linkages and is not fully cross-linked, and as such it tends to melt at relatively low temperatures; for example, under 180° F. The cure time of the polymer often extends to 20 or 30 minutes, and, while the ingredients may be premixed and reacted for some applications, they clearly are not suitable for use in sprayable-type applications, wherein the ingredients are sprayed onto a surface substrate as a coating or sprayed into foam form.

Reaction-injection molding (RIM) techniques have been employed to prepare cured urethane compositions and typically comprise reacting components of a polyisocyanate with another component of a polyol within a nozzle and into an open-mold cavity. However, such RIM urethane compositions are not suitable for use in spraying operations, wherein the components of the composition are sprayed through a narrow orifice, and the spray compositions tend to pick up air and to lead to polymer breakdown, due to shearing forces in the spray nozzle. Further, sprayable compositions must be compounded, to provide for a stoichiometric reaction of the ingredients and to cure very rapidly, so that the spray compositions may be sprayed on horizontal and vertical surfaces, such as ceilings and walls, and quickly react, gel and cure.

SUMMARY OF THE THE INVENTION

The invention relates to a high-modulus, sprayable urethane composition and to a method of preparing and using such composition. In particular, the invention concerns a sprayable urethane composition suitable to be sprayed onto a surface and which rapidly creams and cross-links into a high-modulus, flexible-type, solid surface coating, and to the method of preparing and spraying the composition and to the surfaces so coated.

A method of preparing a sprayable, high-modulus, elastomeric-type urethane composition has been discovered, which composition may be sprayed more particularly in fixed-volume, one-to-one type-volume spray equipment. The compositions are particularly useful in spraying substrate surfaces to provide a unique, high-modulus, flexible coating on the surface, and which surface produces a finished surface very rapidly, generally less than 5 seconds; for example, 3 seconds or less. The sprayable coating composition of the invention rapidly cures and exhibits excellent physical properties, such as superior abrasion resistance, elongation, impact resistance, solvent resistance and dimensional stability at both low and high temperatures. The sprayable composition of the invention is particularly suitable for use in spraying the components for roofing, pipe coatings, tanks, cold storage, floors, walls and particularly overhead surfaces like ceilings, and more particularly for spraying and providing for a thin, sprayable, solid coating onto rigid foams, such as rigid polystyrene or rigid polyisocyanurate foams used as insulation.

The sprayable compositions of the invention are prepared by reacting, through spraying together under pressure, substantial equal volumes of an A-side and a B-side mixture in conventional spraying equipment. The A-side mixture comprises a prepolymer prepared by reacting a polyether triol with a low-functionality MDI. Generally, 100 parts of the prepolymer may be prepared by admixing about 25 to 35 parts; for example, 30 parts, of the polyol with about 65 to 75 parts; for example, 70 parts, of the low-functionality MDI and reacting the components together for about 3 hours at 180° F. Typically, the prepolymer is carefully controlled as regards free NCO, and the polymer generally has from about 20% to 22% free NCO. The MDI employed is typically a 4-4'diphenyl methane diisocyanate. The prepolymer employed on the A side must be prepared from an MDI which has a low functionality, typically a functionality of less than 2.4 and generally 2.0.

The B-side mixture typically comprises the combination of a polyol, a catalyst system and optionally a degassing agent, to prevent or reduce the entrainment of air bubbles, due to spraying in the resulting solid coating composition. The B-side admixture comprises the combination of a diol, typically a diethylene diol, such as 1,4 butane diol, and a low-hydroxyl-number polyether triol, with the polyol composition generally having an average hydroxyl number of less than about 200. The amount of the diol and the triol employed in the polyol composition on the B side may vary, depending on the particular performance characteristics of the coating desired. As the amount of the polyether triol is increased in the composition, the resulting composition becomes more flexible and less stiff, while increases in the diol lead to an increase in stiffness and rigidity. It has been found that the employment of 1,4 butane diol, in combination with a polyether triol having a hydroxyl number of about 50 or less, and typically a triol, such as an ethoxylated propylene oxide, is a particularly useful combination. The B-side mixture generally comprises from about 5 to 40 parts, and more typically 15 to 25 parts, of the 1,4 butane diol, in combination with from about 60 to 95 parts, and more typically 70 to 90 parts, of the ethylene oxide polypropylene oxide triol. The triol employed on the B-side mixture may be the same as or different from the triol employed in preparing the prepolymer on the A-side mixture.

The B-side mixture also comprises a catalyst system, to promote the rapid reacting and curing of the A- and B-side mixtures on admixing and spraying. The amount of the catalyst system may vary, but generally comprises from about 0.01 to 1 part, and more generally 0.01 to 0.1 part per 100 parts of the polyol in the B-side mixture. The catalyst combination, particularly suitable in preparing the sprayable, high-modulus, flexible compositions of the invention, comprises the combination of a tetravalent tin catalyst in combination with an amine-type catalyst. The tetravalent tin catalyst is added to the B-side mixture, to provide for fast gelling time; however, the tetravalent tin catalyst does not provide a sufficient reaction time for use in sprayable compositions, wherein the reaction time must be less than 5 seconds, and typically less than 3 seconds to cream.

The amine catalyst is generally a heat-activated catalyst, such as an acid-blocked catalyst, generally heat-activated at about 160° F. or above. It has been found that a Dabco triethylene diamine catalyst, typically employed with urethane systems, is not suitable for use in the sprayable compositions of the invention, and that an acid-blocked Dabco-type catalyst is required, such as a polyalkylene polyamine, such as a triethylene diamine, which has been acid-blocked; for example, with a short-chain aliphatic acid like formic acid or an aromatic acid like phenolic acid. Such a catalyst is a delayed-action catalyst and, in combination with fatty-acid tetravalent tin salt-type catalyst, provides for the buildup of rapid gel strength, rapid reacting and curing and without foaming, which is undesirable in preparing a solid, sprayable coating. Thus, an acid-blocked diethylene diamine catalyst, normally employed for delayed foaming in the preparation of urethane foams, has been found suitable for use in combination with the tetravalent tin catalyst in the spraying operation of the invention. The amount of the tetravalent tin and the amine catalyst may be varied as desired, but in preferred embodiments is generally used in equal parts. If desired, other catalysts may be employed; however, the combination of the tetravalent tin and the acid-blocked amine catalyst is essential to the spraying, to permit rapid gelling, curing and spraying of the composition.

Optionally but preferably, the B-side mixture also should contain degassing or antifoaming agents, in order to inhibit or prevent the formation of air bubbles in the resulting solid, sprayed coating. Typical degassing agents which may be employed would include a silicone antifoamer, which reduces bubbles and gasses in the coating. The degassing or antifoaming agent is generally employed in amounts ranging from about 0.3 to 2 parts per 100 parts of the polyol in the B-side mixture. The reaction mixtures A and B are typically sprayed together in generally conventional spraying equipment in about a one-to-one volume, such as in Gusmer spray equipment or Glas-Craft spray equipment. The spray conditions generally employ primary heaters at about 120° F. to 160° F.; for example, 140° F., with the hose temperature ranging from about 140° F. to 160° F., and with a pressure employed of greater than 300, and typically 1500 to 2000 psi. The A- and B-side mixtures are intimately mixed and exit from the nozzle and immediately react in spray form.

The high-modulus, sprayable, flexible urethane compositions of the invention thus provide for the spraying of an A-side and a B-side mixture together in fixed-volume, spray-type equipment employing a catalyst combination of tetravalent tin and an acid-blocked amine, and with the A-side mixture comprising a carefully controlled prepolymer, and which A- and B-side mixtures on spraying provide for a very rapid reaction rate, to provide a solid, high-modulus, flexible coating on the sprayed substrate.

DESCRIPTION OF THE EMBODIMENTS

A high-modulus, sprayable, solid urethane coating composition of the invention was prepared employing the following formulation:

| | By Weight |
|---|---|
| A side | |
| Prepolymer (made by the reaction 3 hours at 180° F. of 30 parts of triol E 474 polyol and 70 parts of MDI Rubicon 168 functionality about 2.0 containing 21.5% free NCO) | 100 parts |
| B side | |
| Diol-1,4 butane diol | 20 parts |
| Triol - ethylene-oxide-capped polypropylene oxide (hydroxyl number 35) (E-474 by Union Carbide Corp.) | 80 parts |
| Antifoam agent (5304 silicone of Union Carbide Corp.) | 1 part |
| Catalyst - tetravalent tin salt catalyst (UL-22 Witco Chemical Co.) | 0.03 parts |
| Catalyst - formic acid-blocked triethylene diamine (X-8154 Air Products & Chemicals, Inc.) | 0.03 parts |

The A- and B-side mixtures are about 1:1 by volume. The A- and B-side mixtures were sprayed onto a substrate using Gusmer spray equipment, with primary heat A side 120° F., B side 180° F. hose temperature 160° F. and spray pressure 1500 psi. The time to cream was about 3 seconds or less.

The physical properties of the resulting high-modulus, flexible coating as sprayed are set forth as follows:

| Property | Test Method | Results |
|---|---|---|
| Solids by weight | ASTM D 1353 | 100% |
| Theoretical coverage | | 3 gal/100 ft$^2$ @ 50 mils. |
| Weight per gallon | | |
| Component "A" | | 10.6 lbs. |
| Component "B" | | 9.3 lbs |
| Dry time to touch | | 6 sec. |
| Cure time | | 60 sec. |
| Low-and high-temperature limitations | ASTM D 794 | −30° F. to 180° F. |
| Tensile strength | ASTM D 638 | 2400 psi |
| Elongation | | 400% |
| Flexural strength | ASTM D 790 | |
| Method 1 | | 6,000 psi |
| Modulus | | 200,000 psi |
| Gardner Impact | ASTM D 3029 | |
| @ 77° F. | | 120 in/lbs. |
| @ −40° F. | | 35 in/lbs. |
| Heat deflection @ 66 psi | ASTM D 648 | 85° C. |
| Compressive strength @ 10% | ASTM D 695 | |
| deflection | | 4500 psi |
| at failure | | 11,250 psi |
| Abrasion resistance | ASTM D 3884 Taber Method @ 5,000 cycles | 1.72% loss |
| Specific gravity, sprayed | | 1.12 |
| Viscosity at room temperature | | |

| Property | Test Method | Results |
|---|---|---|
| "A" @ 120° F. | | 400 cps |
| "B" @ 120° F. | | 400 cps |
| Water vapor transmission | ASTM C 355 | 2-3 perms |
| Hardness (Shore A) | ASTM D 2440 | 61 |
| Humid aging (2 weeks) | ASTM D 2126 100% RH @ 7 days @ 158° F. | .3% vol. change |
| Weatherometer Xenon-Arc (no water spray) | ASTM D 2565-79 1000 Hour Fadometer exposure | No surface crazing or cracking Discoloration to dark yellow-tan |

What is claimed is:

1. A method of preparing a high-modulus, solid urethane coating, which method comprises spraying onto a substrate substantially equal-volume amounts of an A-side and a B-side admixture together, to provide for the reaction of said mixture in about 5 seconds or less, to produce a high-modulus, solid coating, the A-side mixture comprising 100 parts of a prepolymer prepared by reacting about 25 to 35 parts of a polyether triol, having a hydroxyl number of about 50 or less, with from 65 to 75 parts of a low functionality MDI having a functionality of about 2.4 or less, and the B side comprising a polyol composition of from about 5 to 40 parts of a diol and from 60 to 95 parts of a polyether triol having a hydroxyl number of about 50 or less, and a catalytic amount of a catalyst composition comprising from about 0.01 to 1 part of the polyol composition and composed of a tetravalent tin salt catalyst in combination with a heat-activatable polyamine catalyst.

2. The method of claim 1 wherein the prepolymer has from about 20% to 22% free NCO.

3. The method of claim 1 wherein the polyether triol comprises an ethylene-oxide-capped polypropylene oxide.

4. The method of claim 1 wherein the diol comprises a 1,4 butane diol.

5. The method of claim 1 wherein the tetravalent tin salt catalyst comprises a tetravalent tin fatty-acid salt catalyst.

6. The method of claim 1 wherein the acid-blocked polyamine catalyst comprises an acid-blocked polyalkylene polyamine.

7. The method of claim 6 wherein the acid-blocked polyamine catalyst comprises a formic-acid-blocked, triethylene diamine.

8. The method of claim 1 wherein the B-side mixture includes an antifoaming amount of a degassing agent.

9. The method of claim 1 wherein on the B-side mixture the diol is present in an amount of from about 15 to 25 parts and the triol is present in an amount of from about 70 to 90 parts.

10. The sprayed, cured, solid, urethane coating composition produced by the method of claim 1.

11. The method of claim 1 which includes spraying the sprayable composition onto a rigid-foam, board stock material as the substrate, to provide a surface coating thereon.

12. A method of preparing a high-modulus, solid, urethane coating composition, which method comprises spraying onto a substrate and reacting together substantial equal volumes of an A- and a B-side mixture, the A-side mixture comprising 100 parts by weight of a prepolymer prepared by reacting an ethylene-oxide-capped polypropylene oxide triol with a low-functionality MDI, the MDI having an average functionality of about 2.0, to provide a prepolymer having about 20% to 22% free NCO, and the B-side mixture comprising from about 2 to 40 parts of a diethylene diol and 60 to 95 parts of an ethylene-oxide-capped polypropylene oxide triol having a hydroxyl number of about 50 or less, and a catalytic amount of a tetravalent tin salt catalyst in combination with a heat-activatable, formic-acid-blocked triethylene diamine, and an antifoaming amount of a degassing agent, the reaction to cream carried out in about 5 seconds or less.

13. The sprayed, cured, solid, urethane coating composition produced by the method of claim 12.

14. The method of claim 12 which includes spraying the sprayable composition onto a rigid-foam, board stock material as the substrate, to provide a surface coating thereon.

15. The method of claim 1 wherein the polyether triol used in preparing the prepolymer comprises an ethylene-oxide-capped polypropylene oxide.

16. The method of claim 8 wherein the degassing agent comprises a silicone in an amount of from about 0.3 to 3 parts of the degassing agent.

17. The method of claim 1 wherein the polyol composition has a hydroxyl number of about 200 or less.

18. The method of claim 1 wherein the catalyst composition provides a reaction to cream carried out in about 5 seconds or less.

19. The method of claim 1 wherein the tin and the polyamine catalyst are present in about equal amounts.

* * * * *